United States Patent [19]

Hotchkiss, Jr.

[11] Patent Number: 4,932,625

[45] Date of Patent: Jun. 12, 1990

[54] DEVICE FOR RELEASABLY SUPPORTING AN OBJECT

[76] Inventor: John E. Hotchkiss, Jr., 156 Red Hill Cir., Tiburon, Calif. 94920

[21] Appl. No.: 290,622

[22] Filed: Dec. 27, 1988

[51] Int. Cl.$^5$ .............................................. A47G 21/14
[52] U.S. Cl. ................................ 248/316.7; 248/37.6; 211/70.7
[58] Field of Search ............ 248/316.7, 37.6, 111–113, 248/229, 316.2; 211/70.6–70.7, 70.8, 69.8, 89, 66; 24/501, 509, 511

[56] References Cited

U.S. PATENT DOCUMENTS

| 959,139 | 5/1910 | Holte | 248/113 |
| 2,178,113 | 10/1939 | Dailey | 211/89 X |
| 2,357,646 | 9/1944 | Gilbert | 211/70.6 |
| 2,590,297 | 3/1952 | Curtis, II | 211/89 X |
| 2,979,300 | 4/1961 | Howell et al. | 248/126 X |
| 3,876,076 | 4/1975 | Hazelhurst | 211/89 X |
| 3,980,608 | 9/1976 | Faltersack | 211/70.6 X |
| 4,310,094 | 1/1982 | Hotchkiss, Jr. | |
| 4,515,277 | 5/1985 | Lethsorensen | 211/89 X |

FOREIGN PATENT DOCUMENTS

| 826626 | 1/1952 | Netherlands | 248/113 |
| 3635830 | 5/1988 | Netherlands | 211/69.8 |

Primary Examiner—Ramon S. Britts
Assistant Examiner—Karen J. Chotkowski
Attorney, Agent, or Firm—Townsend and Townsend

[57] ABSTRACT

A device for releasably supporting an object, said device including a housing with a space therein and a spring member having a segment thereof disposed in said space and another segment in partial registry with recesses formed by housing side walls.

4 Claims, 2 Drawing Sheets

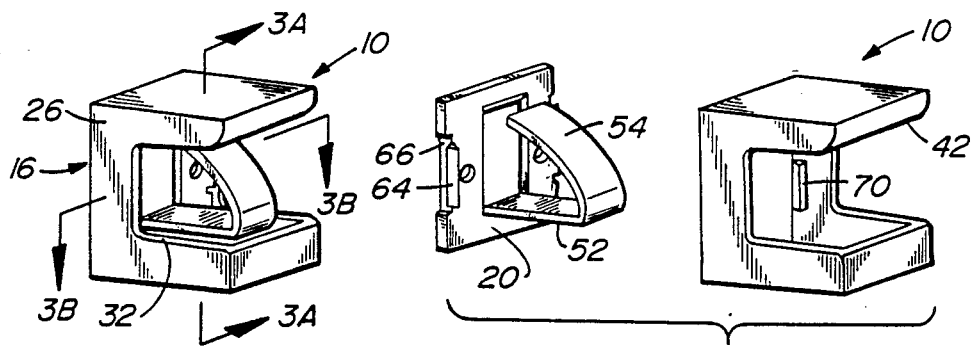
FIG._1  FIG._2
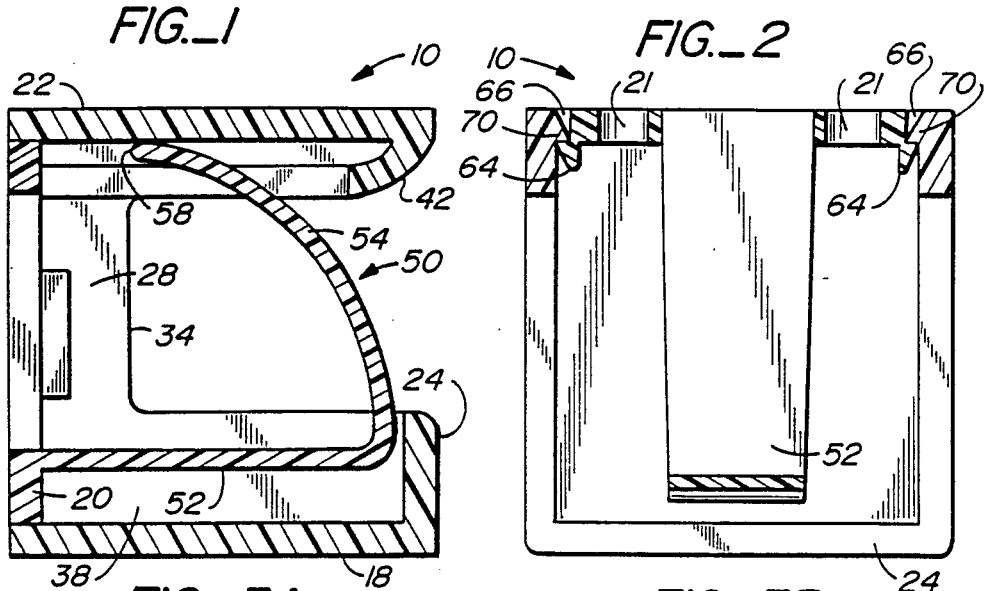
FIG._3A  FIG._3B
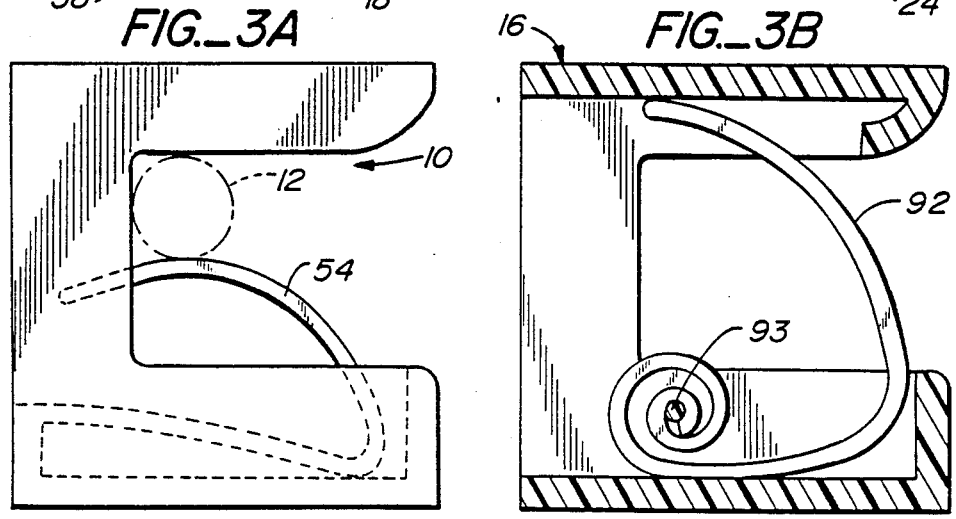
FIG._4  FIG._7

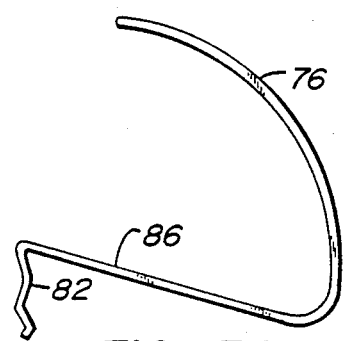
FIG._5A
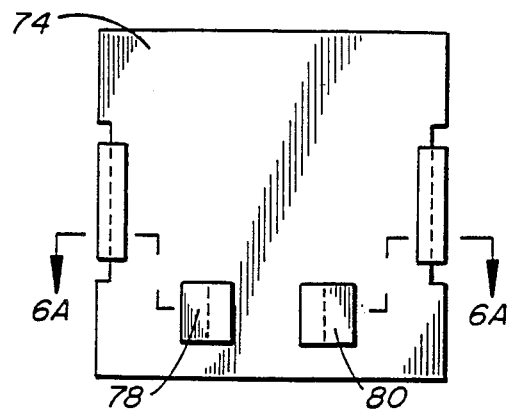
FIG._6
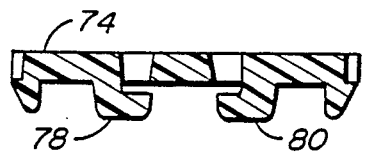
FIG._6A
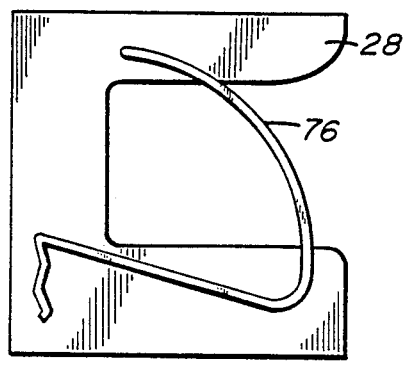
FIG._5B
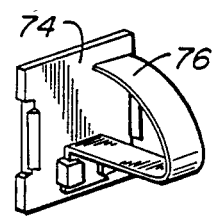
FIG._5
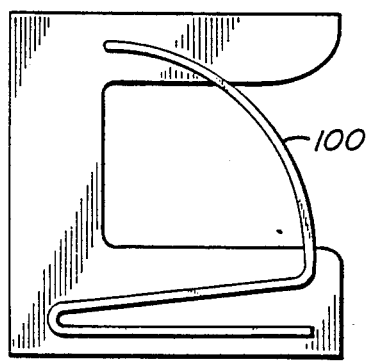
FIG._8
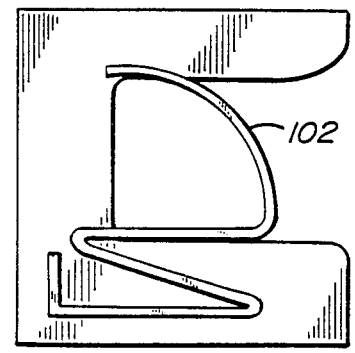
FIG._9

DEVICE FOR RELEASABLY SUPPORTING AN OBJECT

TECHNICAL FIELD

This invention relates to a device for releasably supporting an object, such as a tool, writing instrument, or the like.

BACKGROUND ART

My U.S. Patent No. 4,310,094, issued Jan. 12, 1982, discloses a rack for demountably supporting small hand tools for convenient and ready access. The tool rack disclosed in that patent incorporates a pair of transversely spaced tool receiving recesses defined by transversely aligned tool supporting walls. A spring is mounted between the walls in position for engagement by a tool inserted in the recesses with the spring positioned to engage a midportion of the tool between the walls and to be resiliently deflected away from the walls to resiliently hold the tool in a three-point support.

While the rack disclosed in 4,310,094 is quite satisfactory for its intended use, the particular arrangement disclosed in the patent has occasionally been misused because it requires an understanding of how it works to be utilized properly. On occasion, a user has accidentally engaged a spring incorrectly with a tool when inserting the tool in the pair of recesses. If this is done, the device will not function properly as a holder.

DISCLOSURE OF THE INVENTION

The present device also may be utilized to detachably retain a tool and similar objects such as writing instruments. In accordance with the teachings of the present invention, the spring member utilized in the device cannot be engaged incorrectly by an object such as a tool positioned in recesses defined by side walls of the device. The device can be utilized correctly in all cases. There is nothing in its construction which promotes improper use. Because the preferred embodiment incorporates only a single spring and slot there is no danger that the spring will be engaged improperly. Further, the device of the present invention is characterized by its relative simplicity and consequent low cost. The arrangement of the present invention readily lends itself to construction from plastic according to conventional molding techniques as well as to construction in various combinations of plastics and metals.

The device of the present invention incorporates a housing including a first wall, second and third walls connected to said first wall, a front wall, and spaced side walls interconnecting said first, second, third and front walls. The side walls are spaced from one another with each side wall defining a recess. The recesses are in general alignment and positioned between and spaced from the first and third walls.

The front wall of the device extends between the side walls thereof and defines therewith a space out of registry with the recesses.

A spring member is disposed within the housing and includes a double-ended first segment disposed in said space and out of registry with the recesses. The spring member first segment is attached to the second wall at one end thereof with the other end of the first segment located adjacent to the front wall. The spring member additionally includes a second segment attached to the first segment. The second segment is formed of resilient material and has a generally arcuate configuration, curving rearwardly from the first segment between the recesses and in partial registry therewith.

Other features, advantages, and objects of the present invention will become apparent with reference to the following detailed description and accompanying drawings.

BRIEF DESCRIPTION OF THE DRAWINGS

FIG. 1 is a perspective view of one form of the device constructed in accordance with the teachings of the present invention;

FIG. 2 is an exploded, perspective view illustrating separate components of the device of FIG. 1;

FIG. 3A is an enlarged, cross-sectional view taken along line 3A—3A in FIG. 1;

FIG. 3B is an enlarged, cross-sectional view taken along line 3B—3B in FIG. 1;

FIG. 4 an enlarged side view of the device of FIG. 1 incorporating a diagrammatic illustration of an object being releasably supported thereby;

FIG. 5 is a perspective view illustrating a second wall component of an alternative form of device with a spring member attached thereto;

FIG. 5A is an enlarged side view of the spring shown in FIG. 5;

FIG. 5B is a schematic illustration taken from the side showing the relationship between the spring of FIG. 5 and a device side wall when assembled;

FIG. 6 is an enlarged side view of the rear wall shown in FIG. 5;

FIG. 6A is a cross-sectional view taken along the line 6A—6A in FIG. 6;

FIG. 7 is a side view in cross-section showing an alternative form of spring which may be employed in the device of the present invention; and FIGS. 8 and 9 are views similar to FIG. 5B but showing alternative forms of springs which may be employed.

BEST MODE FOR CARRYING OUT THE INVENTION

Referring now to FIGS. 1-4, a device constructed in accordance with the teachings of the present invention is generally designated by reference numeral 10. The device is for releasably supporting an object such as screwdrivers or other hand tools, writing instruments such as pens and pencils, or the like. In FIG. 4, one such object 12 is illustrated with the cross-sectional profile thereof delineated in phantom. For the sake of illustration only, it may be understood that object 12 is a screwdriver but device 10 is not limited to the retention of this particular type of object.

Device 10 includes a housing 16 including a first wall 18, a second wall 20, a third wall 22, a front wall 24, and spaced side walls 26, 28 interconnecting the first, second, third and front walls.

Side walls 26, 28 are spaced from one another with each side wall defining a recess. The recess defined by side wall 26 is designated by reference numeral 32 while the recess defined by side wall 28 is identified by reference numeral 34. The recesses are in alignment and disposed above first wall 18. Front wall 24 extends between the side walls 26, 28 and defines therewith a space 38 below the level of the recesses.

Side walls 26, 28 are, as may clearly be seen in the drawings, generally configured in the shape of a "C" and the recesses 32, 34 are slots formed in the side walls open toward the front of device 10. The recesses terminate along lines generally parallel to the first and third walls.

A curved lip 42 extends from the third wall 22 between the side walls. Lip 42 is located in general registry with front wall 24. The upper portion of third wall 22 is also preferably curved. The curved lip 42 and curvature at the upper extremity of third wall 22 facilitate placement of objects within recesses 32, 34.

A spring member 50 including a double-ended first segment 52 is attached to the housing 16. More particularly, the spring member first element 5 is integrally formed with the second wall 20. First segment 52 extends from second wall 20 out of registry with recesses 32, 34 and terminates adjacent to front wall 24.

Spring member 50 also includes a second segment 54 attached to the first segment. Second segment 54 is formed of resilient material and has a generally arcuate configuration, curving rearwardly from the first segment between the recesses and in partial registry therewith. In this illustrated embodiment of the invention, the first and second segments of spring member 50 are integrally formed of molded plastic material along with second wall 20. Apertures 21 are formed in second wall 20 for securing the second wall to a support surface, if desired.

As may perhaps best be seen with reference to FIG. 3A, spring member second segment 54 has a distal end 58 normally disposed closely adjacent to third wall 22 when an object is not being releasably supported by the device 10. When, however, an object 12 extends between recesses 32, 34, as shown in FIG. 4, distal end 58 is moved away from the third wall. The outer surface of the object is in engagement with the side walls and the spring member second segment and such structural components cooperate to retain the object in position. Again as may best be seen with reference to FIG. 4, this holding or retention is accomplished by virtue of the fact that object 12 is located on a slope defined by the second segment 54 when object 12 is fully inserted in the recesses. Thus, the force directed against object 12 by second segment 54 urges the object generally toward the second and third walls. Objects of varying diameters may be held by device 10, the only limitation being that their dimensions are such that the aforesaid force is brought into play due to the cooperation between second element 54 and side walls 26, 28.

It is important that first segment 52 of spring member 50 is disposed out of registry with the recesses. If this were not the case, an object being positioned within the recesses might accidentally be brought into engagement with first segment 52 of the spring member rather than the second segment thereof.

Referring now to FIG. 2, it may be seen that the integral second wall and spring member are separable from the remainder of the device. In FIG. 2 the second wall 20 is shown just prior to being positioned into place with the remainder of the housing. With reference to FIG. 2 and FIG. 3B, projecting from the forwardly disposed face of second wall 20 along opposite edges thereof are protrusions 64 which extend over indents 66 formed in the second wall. These protrusions 64 slidingly engage detents 70 projecting inwardly from side walls 26, 28 when the second wall is being locked in position relative thereto. When the second wall 20 is fully seated within the rest of the housing the protrusions 64 and detents 70 snap into engagement with the respective planar walls thereof in face-to-face relationship.

FIGS. 5-6A illustrate an alternative form of second wall and spring member. The modified second wall is identified by reference numeral 74 and the spring by reference numeral 76. In this arrangement, the spring member is not integral with the second wall. The second wall 74, as distinguished from second wall 20, includes lugs 78, 80 projecting therefrom as shown.

Lugs 78, 80 receive the canted end 82 of first segment 86 of spring member 76 and the lugs frictionally engage the first segment to releasably retain it so that it occupies the position shown in FIG. 5B. Spring member 76 may be constructed of plastic or of a material different from that of the second wall, for example, spring metal.

FIG. 7 discloses yet another alternative form of spring member, i.e., spring member 92. In this version, the spring forms an outwardly directed spiral extending from the location of attachment of the spring to a pin 93 extending between the device side walls.

FIGS. 8 and 9 illustrate other alternative spring configurations 100, 102, respectively.

I claim:

1. A device for releasably supporting an object having an outer surface, said device comprising, in combination:

a housing including a first wall, a second wall, a third wall, a front wall, and spaced side walls interconnecting said first, second, third, and front walls, said side walls being spaced from one another with each side wall having a generally C-shaped configuration and defining a recess, said recesses comprising slots formed in said side walls open toward the front of said device and being in general alignment and positioned between and spaced from said first and third walls, said front wall extending between said side walls and defining therewith a space out of registry with said recesses, a curved lip in general registry with said front wall extending from the front of said third wall between said side walls and curving in the direction of said second wall;

locking means for releasably securing said second wall to said side walls; and a spring member including a double-ended first segment disposed in said space surrounded by said front wall, said second wall and said side walls, said first segment being spaced from said first wall and out of registry with said recesses, said first segment having an end attached to said second wall and having an other end with a bend thereon with the other end thereof located adjacent to said front wall, said spring member additionally including a second segment attached to said first segment other end, and second segment being formed of resilient material and having a generally arcuate configuration curving rearwardly from said first segment between said recesses and in partial registry therewith whereby said spring member is entirely disposed within said housing, said spring member second segment having a distal end normally disposed closely adjacent to said third wall when an object is not releasably supported by said device, said distal end adapted to be moved away from said third wall when an object is disposed within said recesses with the outer surface of said object in engagement with said side walls and said spring member second segment, and said curved lip being in general registry with a portion of said spring member second segment adjacent said first segment other end whereby said curved lip is adapted to engage an object being inserted in said device and guide said object toward said second segment.

2. The device of claim 1 wherein said spring member is integrally formed with said second wall.

3. The device according to claim 1 including means for releasably attaching said spring member to said second wall.

4. The device of claim 1 wherein said recesses terminate along lines generally parallel to said first and third walls.

* * * * *